Jan. 20. 1925.

J. D. BEEBE 1,523,927

PROCESS AND APPARATUS FOR MAKING SPIRAL TUBING BY ELECTRIC WELDING

Filed Oct. 11, 1923

WITNESS
Fred Palm
DEL.

INVENTOR.
John D. Beebe,
BY
Erwin, Wheeler & Woodard
ATTORNEYS.

Patented Jan. 20, 1925.

1,523,927

UNITED STATES PATENT OFFICE.

JOHN D. BEEBE, OF CHICAGO, ILLINOIS, ASSIGNOR TO A. O. SMITH CORPORATION, OF MILWAUKEE, WISCONSIN, A CORPORATION OF NEW YORK.

PROCESS AND APPARATUS FOR MAKING SPIRAL TUBING BY ELECTRIC WELDING.

Application filed October 11, 1923. Serial No. 667,812.

*To all whom it may concern:*

Be it known that I, JOHN D. BEEBE, a citizen of the United States, and resident of the city of Chicago, in the county of Cook and State of Illinois, have invented certain new and useful Improvements in Processes and Apparatus for Making Spiral Tubing by Electric Welding; and I do declare the following to be a clear, exact, and complete description thereof, such as will enable others skilled in the art to which my invention relates to make and use the same, reference being had to the accompanying drawing as illustrative of a construction by means of which my invention is reduced to practice.

My invention relates to an improved apparatus designed specifically for making spirally welded pipes and tubes, but is susceptible of general application to the manufacture of spirally welded tubular articles.

The invention comprises means for positively feeding a strip of sheet metal and automatically forming the same into a spiral tube while undergoing such feeding movement, the adjacent or contiguous edges of the strip when the latter is formed into a tube, being designed to be united by electric arc welding, so as to constitute an integral tubular structure with a finished surface.

In such automatic forming means, the strip to be converted into a spirally wound tube is forced by the action of positively driven feeding rollers into a tube forming device, the latter being comprised of a cylindrical mandrel and a surrounding casing or shell, the opposed concentric surfaces of which are maintained in slightly spaced relation, so as to afford easy passage therethrough of the strip under the pressure of the feeding rollers. Such strip in its advancing movement, readily conforms itself to the contour of the mandrel and the shell, so as to emerge from the forming devices in the desired tubular form.

The tube forming devices are arranged at such an angle with relation to the line of movement of the metal strip from which the tube is made, that a spirally wound tubular formation of the desired pitch is produced. The angle in the arrangement of the tube forming devices may be varied by the provisions for adjustment of the forming devices which I have made, so that such angle may be changed to insure the feeding of the strip in such order that a spiral of the precise pitch desired will be produced. At the same time, the contiguous edges of the strip in its tubular form will stand in such proximity as to enable the spirally formed seam to be electrically welded to constitute an integral structure.

The tube forming devices are mounted for adjustment in a horizontal plane, so that the axis thereof may be changed and set at the desired divergent angle from the axis of the strip feeding rollers. Means are also provided for securing the tube forming devices in fixed and immovable position, after adjustment has been made.

Other features involved in the invention will be more specifically referred to hereinafter, and the novelty of the invention will be pointed out in the appended claims.

In the drawings attached and forming part hereof:

Figure 1:
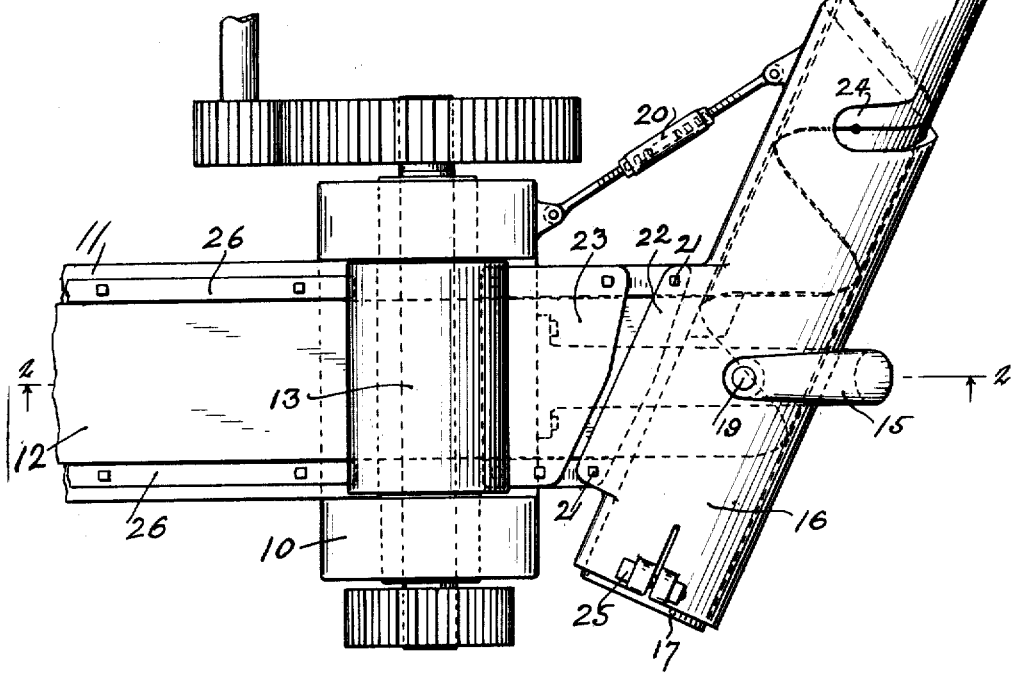
Figure 1 is a plan view showing the general arrangement of the devices in an apparatus in which my invention has been embodied.

In the drawing, the frame 10 supports the table 11, over which passes the flat metal strip 12, which is to be automatically converted into tubular form by spiral winding the longitudinal edges of the said strip being disposed in the transverse plane of the sheet, and united by electric arc welding along the spiral line of such winding. Journaled in bearings in the frame 10 are positively acting driven feed rollers 13 and 14, geared so as to rotate in unison and engaging the respective surfaces of the strip 12, so as to advance the strip into the tube forming devices, whereby the strip is converted into its tubular form with spiral seams. The operation of the driven rollers 13 and 14 is such that the metal strip 12 is advanced at a uniform rate of speed by positive action, and is made to assume its tubular form under the force exerted by the feed rollers.

In order that the flat metal strip thus fed through the machine may be converted into an elongated or wide annulus of spiral construction with its edges in proximity and the convolutions thereof in the same longitudinal plane, we arrange on a bracket 15 carried by the frame 10, a tubular casing or shell 16, the interior diameter of which is equal to the exterior diameter of the tube to be produced. Adjustably mounted at one end within the tubular casing 16, but in fixed relation thereto, is a hollow cylindrical mandrel 17, the adjacent tube shaping surfaces of the casing 16 and the mandrel 17 being concentrically positioned with respect to each other, but separated by an open circular space sufficient to permit the free passage of the sheet 12 through the said space, so as to conform the convolutions of the sheet into the exact annular state desired.

Figure 2:
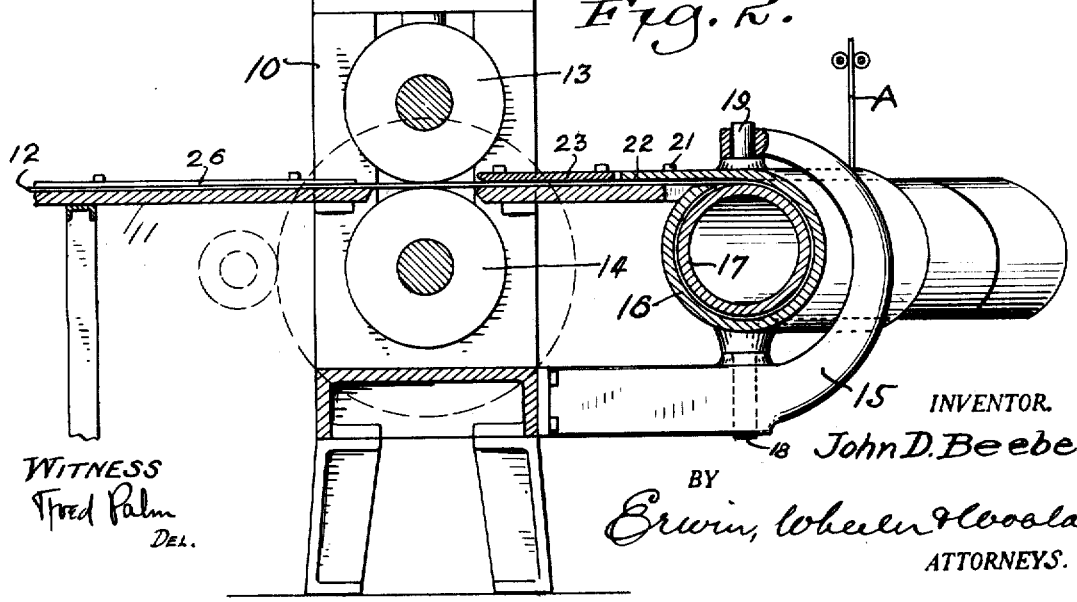
Fig. 2 is a vertical sectional view on the line 2—2, Fig. 1, looking from the top of Fig. 1, in the direction of the arrows.

It will be observed, viewing Fig. 2, that the bracket 15 is curved upwardly at its outer end so as to provide aligned vertically disposed bearings for the journals 18 and 19, formed upon the casing 16. The casing 16 with its adjunctive devices may therefore be rotated upon its vertical axis so as to be adjusted in a horizontal plane and set at any desired angle with relation to the line of movement of the sheet 12. By means of the provisions for adjustment described, the edges of the sheet at the time of completing the spiral tubular formation may be brought into such exact proximity and relation that conditions conducive to a most favorable and effective welding operation may be attained. A tie bar 20, which may be conveniently formed as a turn buckle, is connected at one end with an ear on the swiveled casing 16, and at the other end with an ear on the frame 10, whereby the desired adjustment of the casing may be effected with precision, and thereafter maintained during the operation of the apparatus. Bolts 21, 21, passing through a web 22 extended from the top of the casing 16, and threaded into the table 11 also serve to further maintain the casing 16 in its adjusted position. A guard plate 23 is mounted on the table 11, just in advance of the feeding rollers 13 and 14, a channel being formed between the table and the web 22 and guard plate 23, for insuring the proper advancing movement of the metal strip 12, thus overcoming any tendency of the plate to buckle under the force exerted by the feed rollers and resisted by the tube shaping elements of the apparatus.

The casing 16 is cut away for a portion of its circumference so as to form an opening or recess 24, the sides of which may be parallel to the traveling welding line. The purpose of the said recess 24 is to provide a clearance in which the weldrod A may enter, so as to perform the welding operation upon the contiguous edges of the spirally wound strip. The tubular mandrel 17 is clamped at its rear or inoperative end in the casing 16 by means of a bolt 25 which bridges an axially extending slit in the casing 16, so that the said mandrel may be accurately adjusted and maintained as to its position in the casing.

The table 11 may be provided with longitudinal guides 26, 26, for properly directing the metal strip 12 into the apparatus. A strip 12 upon being laid upon the feed table 11 is entered between the feeding rollers 13 and 14, and thereafter positively fed by such rollers into the tube forming mechanism to be converted into a spirally wound tube, and welded to form an integral structure. As a result of the great pressure exerted by the feeding rollers upon the metal strip, the latter is forced through the tube forming devices by a positive action, and caused to follow the contour of the casing and the mandrel. The latter being set at the desired divergent angle with relation to the line of movement of the strip, it follows from the arrangement that the metal strip will assume the annular form of the tube, with the convolutions extending in the same plane and with the edges in such contiguous or proximate relation, that the welding of such edges may be easily and completely effected.

The clearance between the opposed curved surfaces of the casing or shell 16 and the mandrel 17, is sufficient only to permit the movement therethrough of a single metal strip having the predetermined gauge. Thus, overlapping of the edges of the strip is prevented, and the convolutions of the strip are always disposed in the cylindrical plane of the tube, with the edges of the strip arranged as in ordinary butt welding. This permits the production of a tubular structure having a uniform exterior diameter, and as such is distinguished from spirally wound tubes having lap-welded seams.

Welding devices are now so well known that it is not considered necessary to illustrate the arrangement of the same in the present connection, but such devices may be supported upon the casing 16 and participate in any adjusting movements thereof, so that the point of the weldrod A, which exemplifies the spiral welding devices, will always be traversed by the welding line in the rotation of the tube, and yet maintain a relatively fixed position.

A prior application, Serial No. 627,599, filed March 26, 1923, by Richard Stresau, discloses an arrangement of arc welding devices which are adapted for automatic operation in conjunction with the tube shaping mechanism constituting my invention and herein described, and by means of which welding devices the product resulting from the exercise of my invention is converted into a finished article for commercial distribution to consumers. But such welding devices are not of my invention.

Having thus described my invention, what I claim and desire to secure by Letters Patent of the United States, is:

1. In an apparatus for converting a metal strip into a spirally wound tube with its convolutions laid in the same axial plane, cylindrical forming devices arranged at a divergent angle with relation to the line of movement of the metal strip, in combination with constantly driven rollers acting positively to force the said strip into the forming devices to impart the desired tubular formation to the said strip with its edges in abutting proximity for welding along the spiral line thus formed.

2. In an apparatus for converting a metal strip into a spirally wound tube with its convolutions laid in the same axial plane, cylindrical forming devices arranged at a divergent angle with relation to the line of movement of the metal strip, and means for effecting such angular adjustment of the forming devices to produce the pitch desired, in combination with constantly driven rollers acting positively to force the said strip into the forming devices to impart the desired tubular formation to the said strip with its edges in abutting proximity for welding along the spiral line thus formed.

3. In an apparatus for converting a metal strip into a spirally wound tube with its convolutions laid in the same axial plane, cylindrical forming devices arranged at a divergent angle with relation to the line of movement of the metal strip, means for supporting the forming devices for horizontal adjustment upon its vertical axis, and means for effecting such angular adjustment to produce the pitch desired in the winding, in combination with constantly driven rollers acting positively to force the said strip into the forming devices to impart the desired tubular formation to the said strip with its edges in abutting proximity for welding along the spiral line thus formed.

4. In an apparatus for converting a metal strip into a spirally wound tube with its convolutions in the same axial plane, a forming device comprising a cylindrical mandrel arranged at a divergent angle with relation to the line of movement of the metal strip, and a tubular casing or sleeve concentrically disposed with relation to the said mandrel, to constitute a circular passage for the said strip, in combination with driven rollers acting positively to force the said strip through said passage to impart the desired spiral tubular formation to the said strip with its edges in abutting proximity for welding.

5. In an apparatus for converting a metal strip into a spirally wound tube with its convolutions in the same axial plane, tube forming devices arranged at a divergent angle with relation to the line of movement of the metal strip, in combination with constantly driven rollers engaging the metal strip and acting positively to force the latter into the forming devices to impart a tubular formation to the said strip with its edges in abutting proximity for welding, means for directing the strip to the rollers, and means for directing the strip into the forming devices as moved by the rollers.

6. In an apparatus for converting a metal strip into a spirally wound tube with its convolutions in the same axial plane, tube forming devices arranged at a divergent angle with relation to the line of movement of the metal strip, a frame in which the said tube forming devices are swiveled in vertically aligned bearings, and means for adjusting the said tube forming devices at the desired angle, in combination with driven rollers acting positively to force the said strip through the forming devices to impart a spiral formation to the strip with its edges in abutting proximity for welding.

7. In a tube making machine, tube forming devices comprising a tubular shell or casing and a mandrel supported therein and arranged concentrically to form a circular passage for a strip of tube forming material, means for supporting the tube forming devices in adjusted angular position with relation to the direction of movement of the said strip to impart spiral winding thereto with the edges of the strip in abutting proximity and the coils in the same plane, in combination with means for positively feeding the said strip into the tube forming devices to form a spirally-wound tubular structure.

8. The method of forming a spirally wound tube with its convolutions in the same axial plane, which consists in forcing by a positive and continuous feeding movement a flat metal strip through a cylindrical forming device arranged at a divergent angle with relation to the line of movement of the metal strip, and bringing the edges of the strip into abutting proximity for welding along the spiral line thus formed.

In testimony whereof, I have signed my name at Chicago, this 4th day of October, 1923.

JOHN D. BEEBE.

Witnesses:
FLORENCE E. WINEGAR,
CHAS. H. HALL, Jr.

DISCLAIMER

1,523,927.—*John D. Beebe*, Chicago, Ill. PROCESS AND APPARATUS FOR MAKING SPIRAL TUBING BY ELECTRIC WELDING. Patent dated January 20, 1925. Disclaimer filed February 6, 1931, by the assignee, *The American Rolling Mill Company*.

Hereby disclaims in the said Letters Patent No. 1,523,927, any interpretation of the claims of said patent which would include within the term "cylindrical forming devices", or the term "tube forming devices", or the term "a cylindrical forming device" a structure that is other than a hollow member having a smooth, cylindrical interior surface, through which member the metal is forced in a spiral.

[*Official Gazette February 24, 1931.*]